Sept. 4, 1956  H. W. STAMPS  2,761,239
AERATING ATTACHMENT FOR MINNOW BUCKET
Filed Jan. 2, 1951
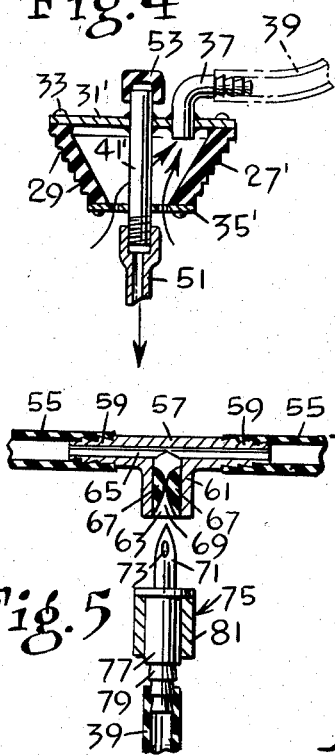
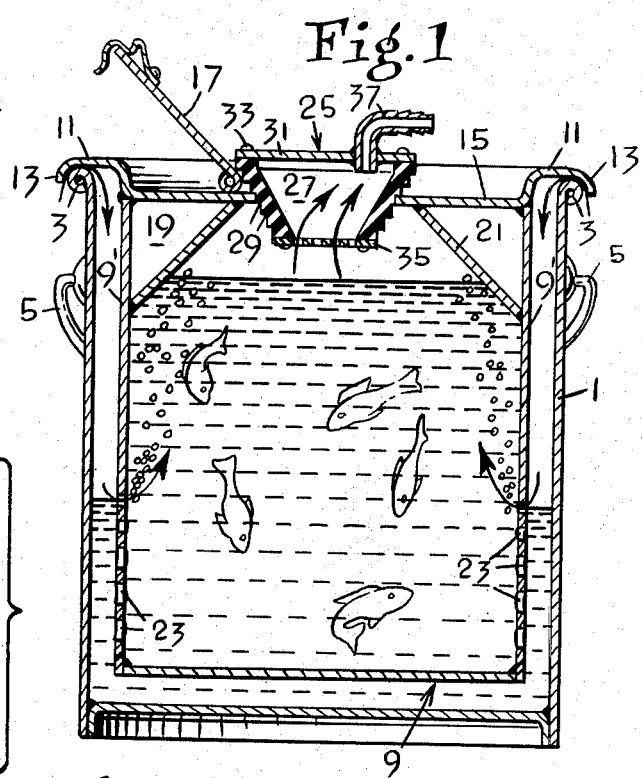
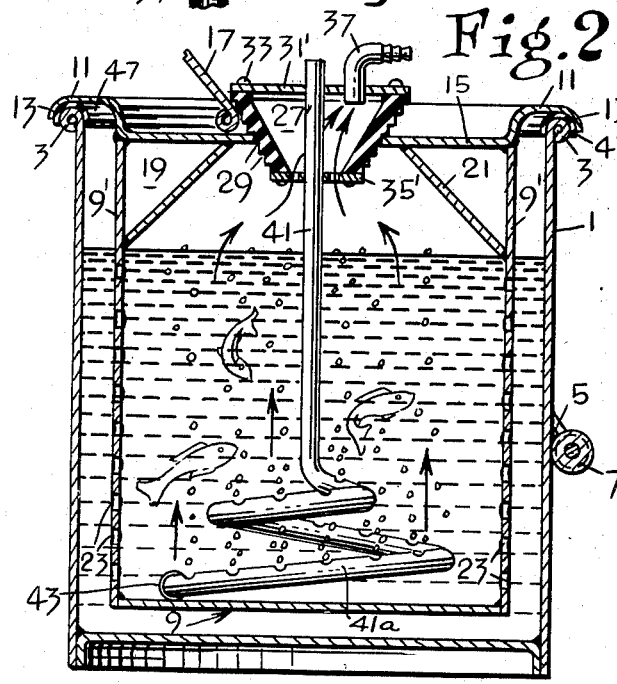
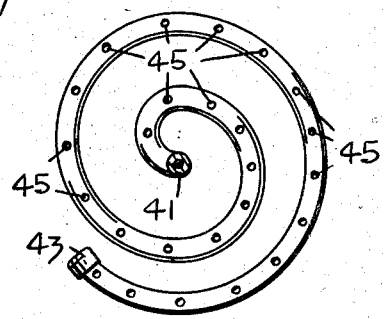
INVENTOR:
Herman W. Stamps,
BY Ralph F. Staubly,
ATTORNEY

United States Patent Office 2,761,239
Patented Sept. 4, 1956

2,761,239
AERATING ATTACHMENT FOR MINNOW BUCKET

Herman W. Stamps, Hendersonville, Tenn.

Application January 2, 1951, Serial No. 203,907

7 Claims. (Cl. 43—56)

My invention relates to an aerating attachment for use with conventional types of minnow buckets and operable from a source of partial vacuum.

It has heretofore been proposed to design special minnow containers having aerators for connection with the partial-vacuum source of the intake manifold of an automobile motor. Such containers, however, were expensive to construct, were difficult to handle and service, and were generally unsuitable for use as minnow buckets. This last disadvantage usually required transfer of the fish to a regular minnow bucket when the fisherman reached his destination.

Prior apparatuses of this type also were not easily or conveniently attachable to and detachable from the source of vacuum.

Objects of invention

Accordingly, it is an object of my invention to provide an aerating attachment for use with standard or conventional minnow buckets, whereby the bother and expense of employing two containers is eliminated.

It is a further object of my invention to design the aerating attachment so that it can be used with many types and sizes of conventional buckets.

Detailed description

In the drawings:

Fig. 1 is a vertical axial sectional view of a conventional float-type minnow bucket showing a preferred form of my attachment in operative assemblage therewith.

Fig. 2 is a view similar to that of Fig. 1 but showing a modified form of the invention.

Fig. 3 is a plan view of the aerating tube of Fig. 2, in section taken at the water level of Fig. 2.

Fig. 4 is a vertical sectional view of a still further modification.

Fig. 5 is a bi-axial cross-sectional view of a vacuum-line plug-in connector for coupling my device with a source of partial vacuum.

Fig. 1 discloses a very simple form of my invention, usable with any double-container minnow bucket in which the upper portion of the walls of the inner container are not perforated. The bucket, which per se does not constitute a part of my invention, consists of an outer water-tight bucket 1, of any suitable material, having a conventional rolled upper rim or lip 3. Part 5 is a bail by which the bucket is carried.

The inner container 9 loosely nests within the bucket 1 so as to provide a water-circulating space between their adjacent walls, as shown. The inner container 9 has an outwardly extending flange 11 down-turned at 13 to overlie and laterally embrace the lip 3 on the outer container 1. Container 9 also has a top wall 15, imperforate except for the central opening (normally covered by the lid 17) through which minnows may be inserted into or removed from the container 9. Optionally the container 9 may be provided with a float chamber 19 formed as by a wall 21 cooperating with the upper lateral space-enclosing portions of the side walls 9' and the top wall 15 of the inner container 9. The side walls 9' of the container 9 (and also the bottom wall, if desired) are provided with water-circulating openings 23 distributed over approximately the lower half of the inner container.

Insertable into the opening in the top wall 15 of the container 9, is the stepped plug member 25, which constitutes an essential part of my invention. The plug 25 comprises a body member 27 of generally inverted-conical shape, and preferably but not necessarily provided with annular or circular steps 29 as shown. Also preferably, but not necessarily, the body 29 is made of a tough and slightly resilient material, such as tire rubber, whereby an air-tight seal with circular openings of various sizes may be readily effected. A top wall 31 of metal or other suitable material seals the top opening of the inverted cone-shaped body 27 and is attached thereto in any suitable manner as by rivets 33. In the modification of Fig. 1 a bottom wall 35 is optionally employable. Passing through the top plate 31 of the plug 25 and having an air-tight connection therewith is the hollow tube or pipe 37 for connection to a source of partial vacuum as by a flexible rubber hose 39 (Fig. 4) and so as to communicate with the compartment within the body 27.

Fig. 2 discloses an attachment similar to that of Fig. 1 but having two important differences. In this form instead of having the space between the two containers 1 and 9 serve as the air-intake conduit, this is accomplished by a centrally located tube 41 passing through vertically alined openings in the top and bottom plates 31' and 35' of the plug 27' with an air-tight seal with at least the upper plate. The lower end 41a of the tube 41 may be given considerable lateral extent, as for example by being bent into the conical spiral shape of Figs. 2 and 3. The illustrated shape of the tube 41 permits "screwing" the spiral end through openings considerably smaller than the diameter of the said end portion. The lower end 41a of the tube 41 may be closed by crimping or by a cap 43, and is provided with a plurality of perforations 45 through which air bubbles emerge to rise through the water, aerating the same.

The second difference in the Fig. 2 modification is the provision of a sealing gasket 47 of rubber or like material which preferably closely embraces the contour of the lip 3 and prevents air from flowing between the flange 11 and the lip 3. Such air flow would fill the partial vacuum created by suction through tube 37 and thus would not permit the establishment of the pressure differential necessary for atmospheric pressure to force air down to the perforated portion of the tube 41.

Fig. 4 discloses a third modification of my attachment. This form of the invention is adaptable for use with either form of bucket. The tube 41' in this form is broken just below the plate 35' and its lower portion 51 is threadedly connectable to or removable from the upper part thereof. When this form is to be used in the manner illustrated in Fig. 1, a sealing cap 53 is placed over the open upper end of the tube 41'. The cap 53 is removed when the extension 51 is employed after the manner of the Fig. 2 illustration.

Fig. 5 discloses a self-sealing connector whereby the vacuum-applying hose 39 Figs. 4 and 5 may be easily and conveniently "plugged-in" or disconnected from the usual windshield wiper vacuum line 55. The connector comprises a T member 57 provided with stepped tapered end extensions 59 over which the cut ends of the vacuum line 55 may be forced to form an air-tight joint therebetween. The T 57 has a lateral extension 61 provided with a bore 63 communicating with the bore 65 passing through the fixture 57. The bore 63 is normally sealed by the sleeve 67, which is formed of rubber or other resilient material compressedly forced into the bore 63. The sleeve 67 has a tapered opening 69 in its outer end through which a needle-like member 71 may be forced. The needle-like member 71 is hollow and is provided with openings 73 through which the hollow of the member 71 can communicate with the bore 65 when the connector generally designated as 75 is "plugged-in". Plug 75 comprises a tube 77 the reduced end of which is the needle 71. It also has a tapered stepped portion 79 for insertion within the rubber tube 39. The plug member 75 optionally may be provided with a grip-forming cover 81.

*Mode of operation*

If the connector of Fig. 5 is to be used as suggested above, the windshield wiper vacuum line 55 is severed at any convenient point and the T member 57 is inserted into the cut ends. The connector hose 39 which is connected to both the plug-in connector 75 and the attachment plug 25, is of a length which will permit convenient location of the minnow bucket in the automobile, truck, or other vehicle. In the Fig. 2 form the gasket 47 is placed as shown and the inner container is rested thereon. Next the spiral end of the tube 41 is threaded through the opening in the top 15 and is lowered into the container 9 until the body of the plug 27' snugly engages the edges of the opening, as shown. When the plug 75, or rather its needle 71, is inserted into the T connector, a suction will be applied to the upper air-filled sealed space in the bucket, whenever the motor of the automobile is running. This suction will permit atmospheric pressure to force air downwardly through tube 41 to issue through openings 45 as aerating bubbles.

In the modification of Fig. 1, the space between the bucket 1 and the container 9 serves the same purpose as the air tube 41 in Fig. 2. Since the openings 23 stop halfway up the side walls 9' of the inner container, air will enter the container through the top ones of said openings, to bubble up through the water, as shown in Fig. 1.

The form of Fig. 4 is capable of use in the manner of that of Fig. 1 by leaving cap 53 in place and removing extension 51 of the air tube 41'. It can also be used after the manner of that of Fig. 2 by retaining the extension 51 and removing the cap 53.

Having thus described my invention, I claim:

1. An aerating minnow bucket, comprising: a water-holding receptacle having top, bottom and side walls forming a relatively air- and water-tight chamber except for a relatively small access opening in said top wall, a displaceable cover movable to close or open said top access opening, a plug-like member insertable in said access opening to seal the same, an air-intake conduit passing downwardly through said plug-like member for conducting and discharging air into water in the lower portion of said receptacle, and an air-outlet conduit passing through at least a portion of said plug-like member for connecting the upper portion of said chamber to a source of partial vacuum, whereby atmospheric pressure will force air downwardly through said air-intake conduit to bubble through said water to aerate the same, said plug-like member comprising a generally conical rubber-like annular wall and upper and lower plates connected to said annular wall to form a compartment therewith, and said air-outlet conduit communicating with said compartment.

2. An aerating minnow bucket according to claim 1 and in which said plug-like member has ring-shaped steps lying in planes perpendicular to the axis of said member.

3. An aerating minnow bucket according to claim 1 and in which said air-intake conduit has an upper portion attached to said member and a lower portion detachable from said upper portion.

4. An aerating minnow bucket according to claim 1 and in which said air-intake conduit in said lower portion has a conical large-based screw-like form whereby it may be inserted through an access opening considerably smaller than its maximum diameter.

5. An aerating minnow bucket according to claim 1 and in which said air-intake conduit has a detachable means for sealing its intake opening.

6. An aerating minnow bucket according to claim 1 and in which said top wall is removable from said side walls and in which there is a resilient sealing gasket interposable in the junction between said walls.

7. An aerating minnow bucket according to claim 6 and in which said gasket has a channel in its lower surface for receiving therein the upper edges of said side walls.

References Cited in the file of this patent

UNITED STATES PATENTS

| | | |
|---|---|---|
| 229,223 | Wood | June 22, 1880 |
| 1,059,070 | Roberts | Apr. 15, 1913 |
| 1,794,842 | Foster | Mar. 3, 1931 |
| 1,995,215 | Mehlsen | Mar. 19, 1935 |
| 2,007,326 | Carpenter | July 9, 1935 |
| 2,031,164 | Johnson | Feb. 18, 1936 |
| 2,137,397 | Haldeman | Nov. 22, 1938 |
| 2,154,741 | Gray | Apr. 18, 1939 |
| 2,196,785 | Takiguchi | Apr. 9, 1940 |
| 2,303,757 | Pierson | Dec. 1, 1942 |
| 2,399,516 | Snyder | Apr. 30, 1946 |
| 2,402,781 | Schreiber | June 25, 1946 |
| 2,493,952 | Eidson | Jan. 10, 1950 |
| 2,590,376 | Campbell | Mar. 25, 1952 |